Figure 1:
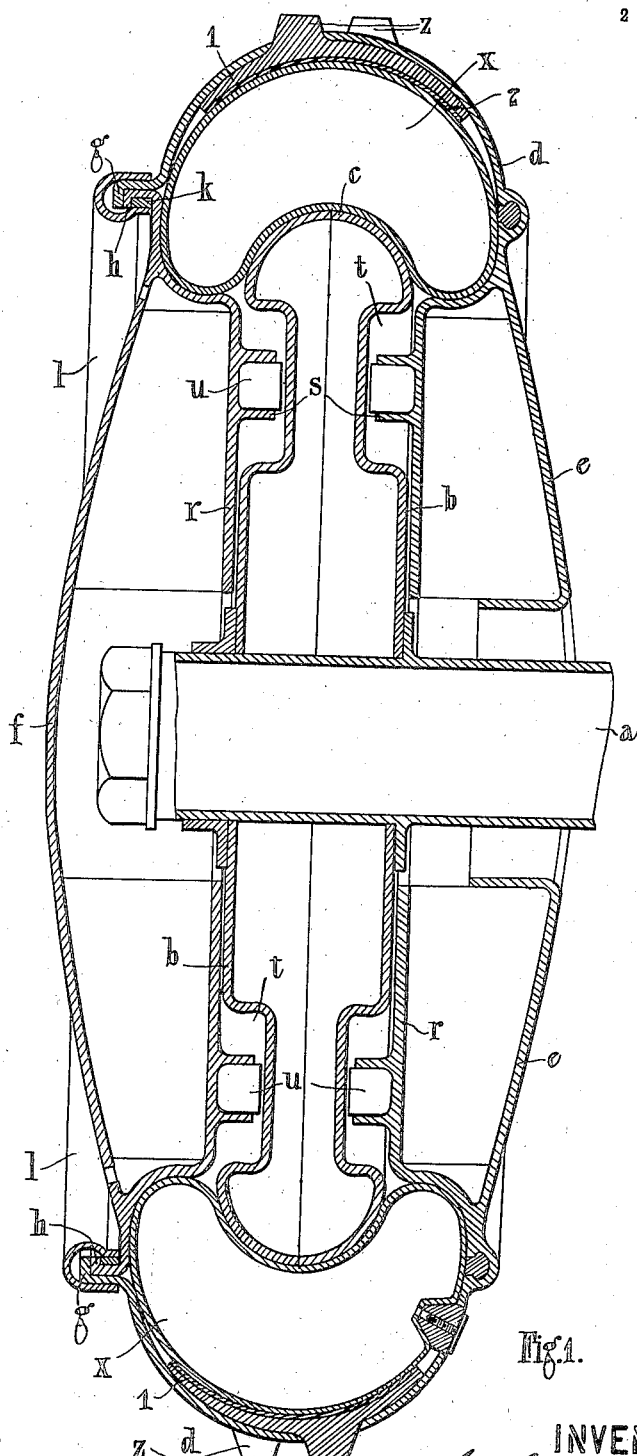

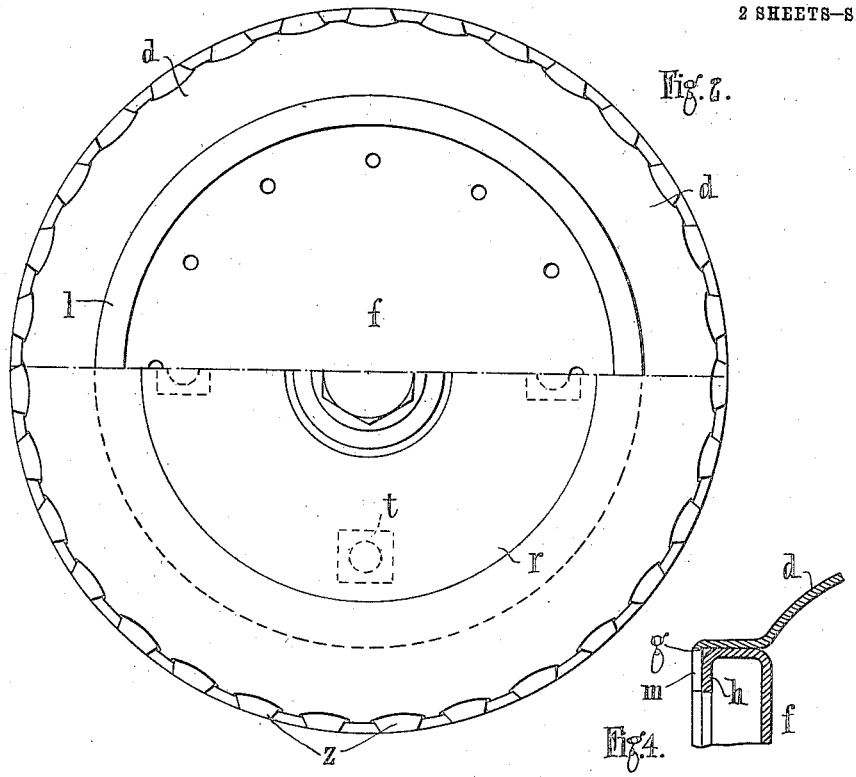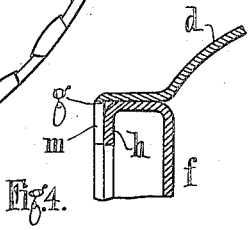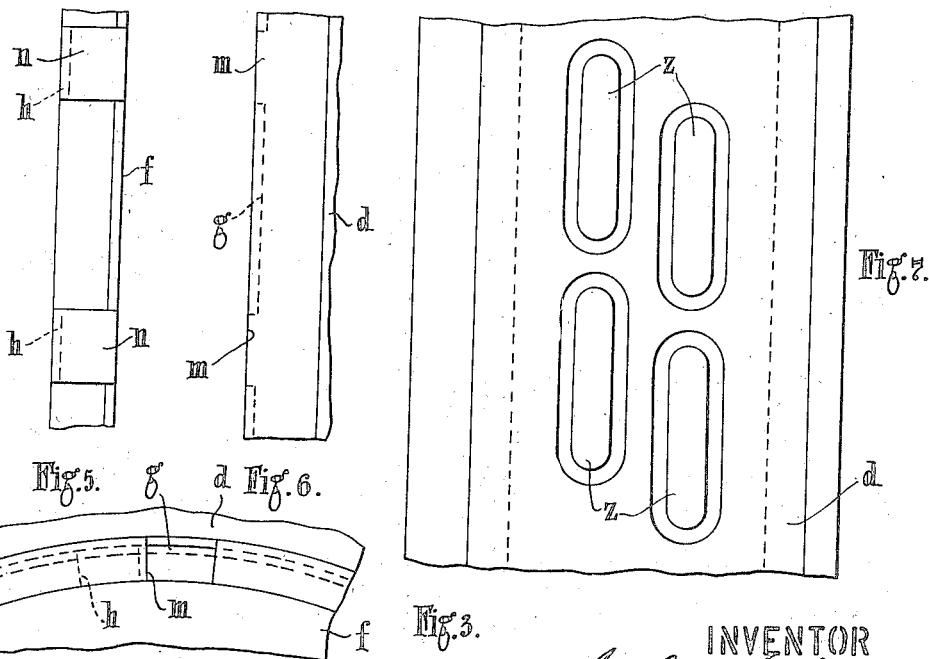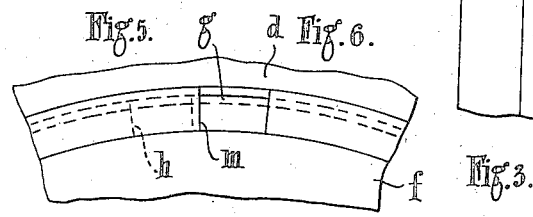

UNITED STATES PATENT OFFICE.

JACOBUS SPYKER, OF AMSTERDAM, NETHERLANDS.

ELASTIC TIRE FOR VEHICLES.

1,102,811.   Specification of Letters Patent.   Patented July 7, 1914.

Application filed December 8, 1913. Serial No. 805,455.

*To all whom it may concern:*

Be it known that I, JACOBUS SPYKER, a subject of the Queen of the Netherlands, and residing at Sarphatistraat 1ᵈ, Amsterdam, Netherlands, have invented certain new and useful Improvements in and Relating to Elastic Tires for Vehicles, of which the following is a specification.

This invention relates to elastic wheels for vehicles and more particularly those used for motor driven vehicles.

The object of the invention is to simplify the construction of such wheels, to prevent all lateral distortion of the wheel, to enable such wheels to be driven at a high rate of speed, to create little or no dust and to prevent the settling of dust on the driving and other parts of the vehicle immediately adjacent the wheels.

The invention primarily consists in an elastic wheel comprising a hollow casing within which is arranged an inner or propelling wheel and a flexible outer supporting rolling surface, the three being held and operating together by means of a cushion of compressed air combined therewith and arranged between the supporting rolling surface and the inner or propelling wheel in such a way that the movements of the outer supporting surface and those of the inner wheel are restricted by the air cushion, the said cushion being supported and protected by the outer casing, and the outer moving part being guided by the said outer casing.

The invention will now be described with reference to the accompanying drawings in which:

Figure 1 is a general transverse sectional elevation of a wheel constructed according to the invention. Fig. 2 is a side elevation of the wheel in Fig. 1 with half of the cover plate removed to show the parts behind it. Fig. 3 is a fragmentary side view at the intersection of cover plate $f$ and casing $d$.
Fig. 4 is a transverse section showing the interlocking of parts $f$ and $d$. Fig. 5 is a plan view of a portion of the plate $f$ showing its interlocking devices. Fig. 6 is a plan of a fragment of casing $d$ showing its interlocking devices. Fig. 7 is a plan view of a section of the wheel showing the tread.

The wheel hub $a$ carries the inner or propelling wheel $b$ which may be of solid or hollow formation and of any material but it is rigidly attached to the hub $a$ in any suitable manner. It is shown as hollow and is preferably formed by stamping sheet steel blanks joined at the opposing edges by welding or otherwise. The periphery $c$ of the propelling wheel is preferably rounded or of any other shape so as to present a smooth face. The propelling wheel is inclosed within a hollow protecting casing or outer wheel $d$ formed of any suitable rigid material. Such material may consist of steel, wood, compressed paper or cardboard and the like rigid material and forms a casing in two parts, one $e$ being of dished form with a concaved or overhanging peripheral portion and the other $f$ comprising a concaved cover plate.

The outer wheel structure or casing is provided with cushion seats 3 at each side of the rounded periphery $c$ of the inner structure. These seats face outwardly and have a suitable curvature and receive portions of the air casing at each side of the inner wheel structure, and these parts of the air cushion exert inwardly-directed pressure against the outer structure. Together with an outward pressure exerted against tread portion $d$ this arrangement very effectively locates the two major wheel portions in respect to each other. The arrangement also provides for a very large air cushion arranged in a novel and effective and durable way. The complete outer casing or wheel $d$ is of smooth regular form presenting no jutting points, such as axle projections, and the cover plate $f$ is placed on the " off " side of the wheel, so that the inner parts of the wheel may be examined by easily removing the cover plate. The two sides of the wheel are preferably of convex shape to preserve the symmetry of the structure. The convexity of the outer face of the wheel also serves to protect it because if this cover plate encounters obstacles its convex shape tends to push them away or to push the wheel away from them without injury.

The cover plate is secured in position by suitable fastening means, of which an exemplifying embodiment is shown in the form of joint shown in Fig. 1, the outer casing or wheel is made with a flange g and the cover plate with a flange h. These two flanges are each turned inward, the inner recess produced being filled up with a rubber ring k. The flanges g and h, in order that they may constitute a hit and miss device, are each made with recesses m to correspond with projections n also formed in each, so that the cover plate f may be placed in position from the side and then given a movement of rotation to lock the solid portions of one ring behind those of the other. Over the joint thus formed a U-shaped or other suitable spring ring l is slipped to lock the device.

The two parts of the outer casing are fitted with internal disk portions r connected by curved internal shoulder portions with respectively, the cover plate and the part e. The disk portions r are fitted with projections or ribs s positioned in recesses t formed in the sides of the propelling wheel which are of a size sufficient to allow of free relative movement of the inner and outer wheel members in the plane of the wheel.

It will be understood that such relative movement occurs without any positive guiding or sliding taking place. The recesses and projections above described also form stops whereby on the occurrence of a heavy shock they constitute supplementary stops to limit the movement of the hub toward the ground or vice versa. The projections or ribs s are fitted with tops or points u of rubber or other soft material so as to obviate knocking if any lateral movement occurs.

Between the interior of the outer wheel casing and the external periphery of the inner or propelling wheel is arranged a pneumatic cushion x in the form of a tube inflated by means of a valve or the like y. When inflated the pneumatic tube assumes somewhat of a U-shape as shown, and it will be understood that the degree of inflation is controlled inwardly by the inner or propelling wheel and outwardly by the outer wheel casing so that bursting or overcharging is impossible. The periphery of the outer wheel casing is made with a number of orifices through each of which pass a projecting stud block or support z of rubber or other suitable resilient material. The studs on the outside rest on the ground or running surface and inside on the pneumatic cushion and perform a guided movement in the guiding holes of the outer casing. These studs are formed integral with a band 1, which may be placed between the pneumatic cushion and the interior of the outer wheel casing and formed of a number of section lengths and to further insure protection against puncture a backing strip 2 of leather, which also prevents heating, may be applied between the exterior of the pneumatic cushion and the interior of the band 1.

It will have been understood from the foregoing that the pneumatic tube is so arranged between the outer casing and the inner wheel that its inner periphery is supported against the circumference of the inner wheel and the internal shoulders of the outer casing, while its outer surface is supported by the outer wheel casing. When a charge due to load occurs, on the inner wheel for instance, it is absorbed firstly by the compression of the air owing to the decrease in volume which occurs and secondly in that no lateral or circumferential dilatation of the pneumatic tube is possible at the flattened part of the tread.

Having now fully described and ascertained my invention and in what manner the same is to be performed, I declare that what I claim is:—

1. In a yieldable wheel structure for vehicles, in combination, a hub and inner wheel structure thereon having a rounded periphery, a rigid outer wheel structure comprising substantially symmetrical, outwardly-dished side plates and a rounded tread portion provided with peripheral apertures, movable tread studs passing through the apertures and a pneumatic cushion engaged between the periphery of the inner wheel structure and the tread and engaging the bases of said studs, said cushion extending laterally beyond the inner wheel structure and engaging outwardly-facing, annular seats carried by the outer rigid wheel structure, the parts being constructed and arranged so that the parts of the wheel are held in operative relation to each other by pressure of said pneumatic cushion.

2. In a yieldable wheel for vehicles, the combination of a hub, a rigid inner wheel member thereon, a rigid outer member comprising a rounded tread portion and an outwardly-dished web portion provided with an aperture to embrace the hub, said tread portion being apertured on its periphery, studs passing through said apertures, a pneumatic cushion interposed between the inner structure and the bases of the studs and said tread, a cover plate outwardly-dished and interlocking devices carried by said tread portion and said cover plate for removably securing the cover plate in position to form a complete closure for the outer side of the wheel, the parts being constructed and arranged so that said pneumatic cushion is subject, when the wheel is loaded, to double compression, applied to the cushion both upon its outer and inner sides.

3. In a yieldable wheel structure for vehicles, the combination of a hub, an inner rigid wheel member, an outer rigid tread member, cushion means between said members, a cover plate, flanges on said tread member and cover plate, and interlocking devices on said flanges whereby the cover plate is removably secured in position by rotating it in relation to the tread member.

In testimony whereof I have signed my name to this specification in the presence of two subscribing witnesses.

JACOBUS SPYKER.

Witnesses:
BERTRAM H. MATTHEWS,
HENRY E. DOD.